June 24, 1952   G. H. J. BAULE   2,601,494
EJECTOR MECHANISM FOR AUTOMATIC BAR FEEDS
Filed June 19, 1947
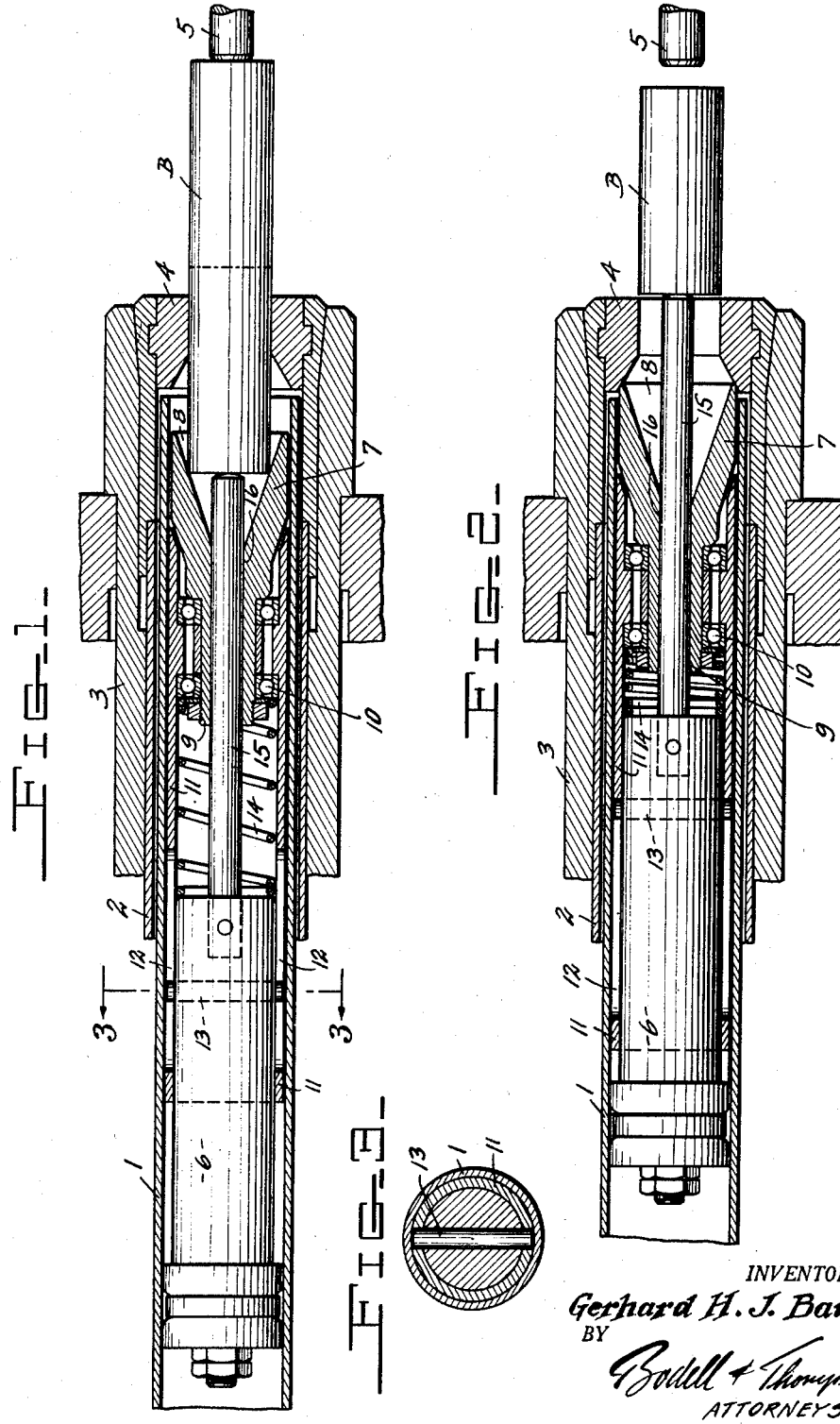
INVENTOR:
Gerhard H. J. Baule,
BY
Bodell + Thompson
ATTORNEYS.

Patented June 24, 1952

2,601,494

UNITED STATES PATENT OFFICE 2,601,494

EJECTOR MECHANISM FOR AUTOMATIC BAR FEEDS

Gerhard H. J. Baule, Syracuse, N. Y., assignor to Lipe-Rollway Corporation, Syracuse, N. Y., a corporation of New York Application June 19, 1947, Serial No. 755,615

1 Claim. (Cl. 29—59)

This invention relates to bar feeds for automatic metal working machines in which the stock bar is fed automatically through the rotating spindle and the collet of the machine against the stop of the machine, the portion of the bar between the collet and the stop machined, the machined portion cut off, and the bar again fed against the stop; these operations being repeated until the bar is used up except for a remnant too short for a finished work piece, or product, with the butt end long enough to be firmly gripped by the collet.

The invention has for its object an ejector mechanism which operates to eject the remnant at the end of the last feeding movement of each bar, which mechanism is embodied in and is part of the actuator or pusher of the feed mechanism which forces the bar through the hollow spindle and the collet of the metal working machine.

More specifically the invention has for its object an ejector which is carried by a pressure operated pusher, which works in a guide alined with the hollow spindle of the machine, and which is extended through the socketed head, which receives the butt end of the bar, and into the socket of the head against the end of the bar, which pusher and head feed axially of the guide and have relative axial resilient movement when the bar encounters the stop of the machine and when the feeding of the socketed head is stopped, as by the collet, before the outer end of the bar reaches the stop. The stopping of the head occurs only when either the bar encounters the stop, or when the head is stopped by the collet, and the bar is too short to reach the bar stop of the machine.

The invention is shown as embodied in a bar feed in which the pusher is a piston and moves in a guide tube or cylinder under pressure, as compressed air, to feed the bar through the hollow rotating spindle and the collet of the machine against the stop of the machine.

The invention consists in the novel features and in the combinations and constructions hereinafter set forth and claimed.

In describing this invention, reference is had to the accompanying drawings in which like characters designate corresponding parts in all the views.

Figures 1 and 2 are longitudinal sectional views of one embodiment of bar feed mechanism embodying the ejector mechanism, the parts being shown in Figure 1 as in their position assumed during the normal feeding operation when the bar encounters the stop of the metal working machine, and in Figure 2 showing the position assumed when the bar is too short to reach the stop and the socketed head of the feed mechanism stopped by the collet, and the ejector operating to eject the remnant of the bar.

Figure 3 is a sectional view on line 3—3, Figure 1.

In the drawing, 1 designates the bar feed guide tube or cylinder alined with the rotating spindle 2 in the head stock 3 of the metal working machine. The numeral 4 designates the collet. 5 is the fixed stop of the machine to limit the distance the bar is fed beyond the collet. This stop is adjustable axially to conform to the length of the finished work pieces. It is set or adjusted the proper distance from the collet for a quantity of duplicate work pieces to be machined and cut from the bars.

The tube 1 is shown as extending into the hollow spindle 2 although in machines of this type it is common to terminate the tubes short of the outer end of the hollow spindle, and the push piston, which works in the feed tube 1, constructed to bridge the gap between the end of the feed tube and the hollow spindle, as in Mariotte Patents Nos. 2,339,712, January 14, 1944, and 2,300,457, November 3, 1942.

The numeral 6 designates the body of the pusher which, in this embodiment of the invention, is a piston movable in the tube 1, and 7 designates the socketed head of the pusher construction, the socket 8 of which receives the butt end of the bar B and centers the bar relatively to the ejector rod, to be presently described. The walls of the socket are conical or tapered.

The socket 8 is rotatable with the bar B and, as here shown, is provided with an axial hub or stem 9 having antifriction journal and thrust bearings 10 in a sleeve 11 enclosing the advance end of the piston 6 so as to be carried by the piston and to extend beyond the end of the piston so that the socketed head 7 is spaced axially from the piston 6. The piston 6 is mounted to have an axial movement relative to the sleeve 11, it being here shown as formed with diametrically opposite lengthwise slots 12 for receiving a transverse pin or key 13 on the piston 6. This mounting permits the piston to move axially, relatively to the socketed head, an amount at the most equal to the length of the slots 12. The pin also holds the sleeve 11 from rotation with the socketed head 7 which rotates with the rotating bar B under the rotation of the spindle 2.

The sleeve 11 constitutes a connecting member or means between the body of the pusher construction and the socketed head, so that the body has an axial movement relative to the head. The relative movement of the body or piston 6 takes place when the socketed head 7 encounters the collet 4, as seen in Figure 2, which acts as a stop to limit the movement of the head. It may take place, to some extent, when the bar B encounters the stop 5. The socketed head 7 engages the collet when the last portion of the bar is being fed and that portion is not long enough to engage the stop 5. The socketed head 7 and the piston 6 are held normally spaced apart by yielding resilient means here shown as a compression spring 14 interposed between the advance end of the piston 6 and the socketed head 7, or its bearings 10, this spring being loaded a predetermined amount and the pressure thereof is less than the actuating pressure behind the piston 6. The spring yieldingly restrains movement of the piston 6 relative to the head 7.

The ejector mechanism includes an ejector rod 15 projecting from the advance end of the piston 6 and carried thereby and slidable through an axial passage 16 in the socketed head 7 and projecting into the socket 8 of the head 7 to thrust against the end of the bar B to feed the bar. The ejector mechanism, as a whole, also includes the spring 14 and the sliding socketed head 7. The spring 14 holds the head firmly against the bar B during the feeding of the bar B by the ejector rod 15, the head serving to center the bar B in the tube or the spindle.

In operation, with a new bar in the tube 1, the pressure behind the piston 6 feeds the outer end of the new bar against the stop 5 of the machine, at which time the machine automatically operates so that the tools thereof work on the end of the bar projecting beyond the collet 4. When a work piece is finished, it is cut off automatically, and the air pressure being then free to act on the piston, pushes the bar farther out against the stop 5. This operation is repeated until the bar is used up. When, however, the last piece of the bar is too short to reach the stop 5 and be held by the collet, the socketed head 7 is stopped by the collet and the piston continues to act compressing the spring 14, which is partly loaded, from the position shown in Figure 1 to that shown in Figure 2, thus causing the ejector rod 15 to push out the remnant of the bar, as seen in Figure 2. The machine is then stopped either by operator control means, or automatic control means, the piston retracted by its usual means, not forming part of this invention, and a new bar loaded in the feed tube 1. (See Mariotte Patents Nos. 2,339,712, January 18, 1944, and 2,327,916, August 24, 1943.) The operations are then repeated.

For best continuous working, the bars are initially cut of such length that the last portion of the bar is the length of the work piece plus an additional length sufficient to be firmly held by the collet 4. As soon as the last work piece is cut off, the ejector acts to throw out the remnant. However, the automatic stopping means of the type shown in Mariotte Patent No. 2,300,457, November 3, 1942, may be used to automatically stop the machine with bars of any length when the bars do not come out even. In such case however, the last portion of the bar may be long enough to reach the stop 5, but the butt end not long enough to be firmly gripped by the collet 4. Hence, while the machine is stopped, the collet is opened by hand and the bar removed from the collet.

What I claim is:

A mechanism for feeding step by step bar stock through the collet of a metal working machine to the tools thereof, said mechanism comprising a bar feed pusher and a socketed head spaced axially from the pusher and having an axial bore, a loaded compression spring between the pusher and the head, and an ejector rod carried by the pusher and normally movable as a unit therewith and slidable axially through the axial bore of the head into the socket thereof to engage the end of the bar seated in the socket and acting to eject the remnant of the bar when the pusher is actuated after the head has been feed against the collet.

GERHARD H. J. BAULE.

REFERENCES CITED

The following references are of record in the file of this patent:

UNITED STATES PATENTS

| Number | Name | Date |
| --- | --- | --- |
| 329,182 | Marsh | Oct. 27, 1885 |
| 2,128,186 | Jones | Aug. 23, 1938 |
| 2,334,272 | Mariotte | Nov. 16, 1943 |